Aug. 24, 1926.
F. L. CURTIS
VEHICLE BODY
Filed July 14, 1925
1,596,924
4 Sheets-Sheet 1
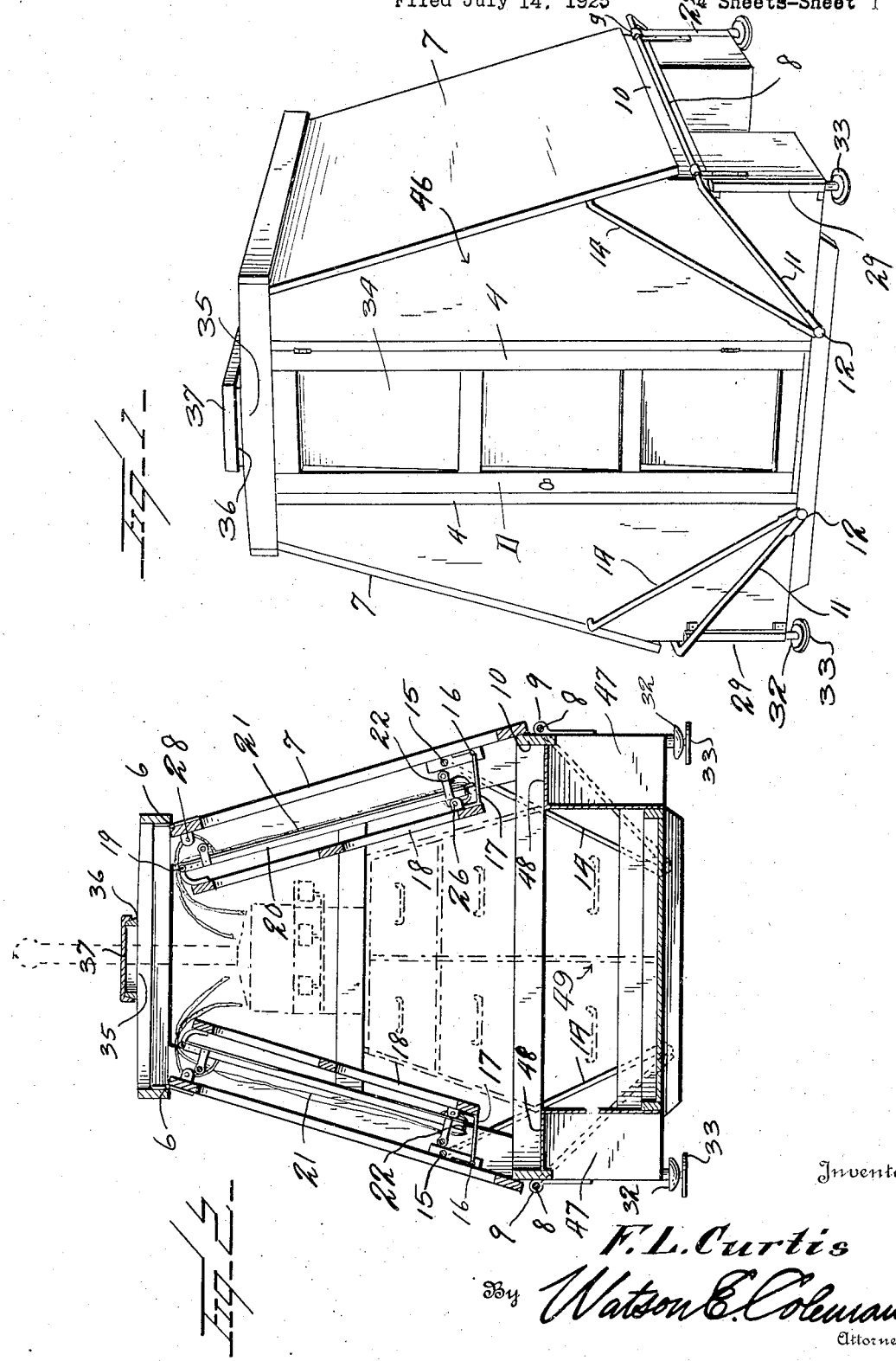
Inventor
F. L. Curtis
By Watson E. Coleman
Attorney

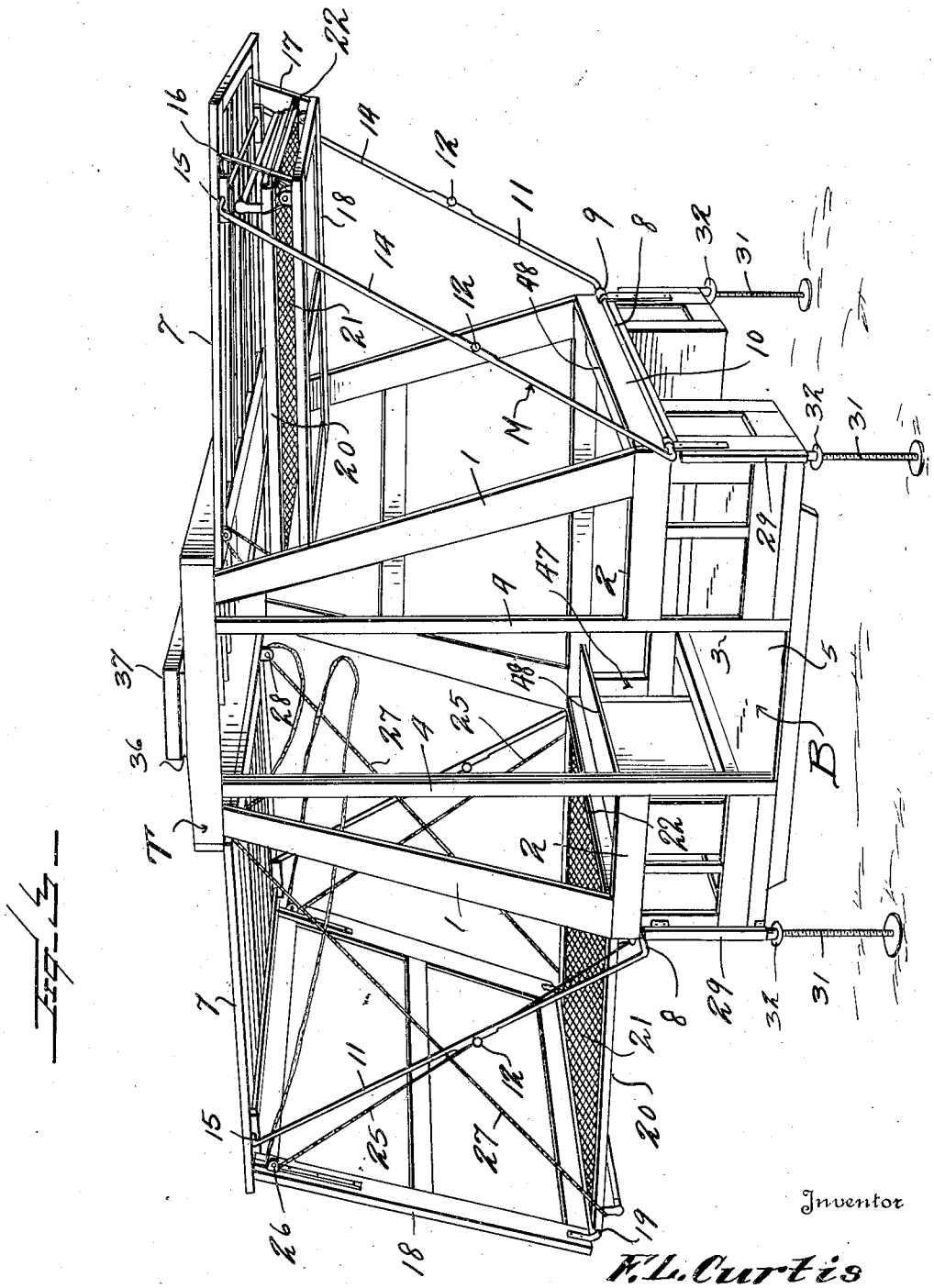

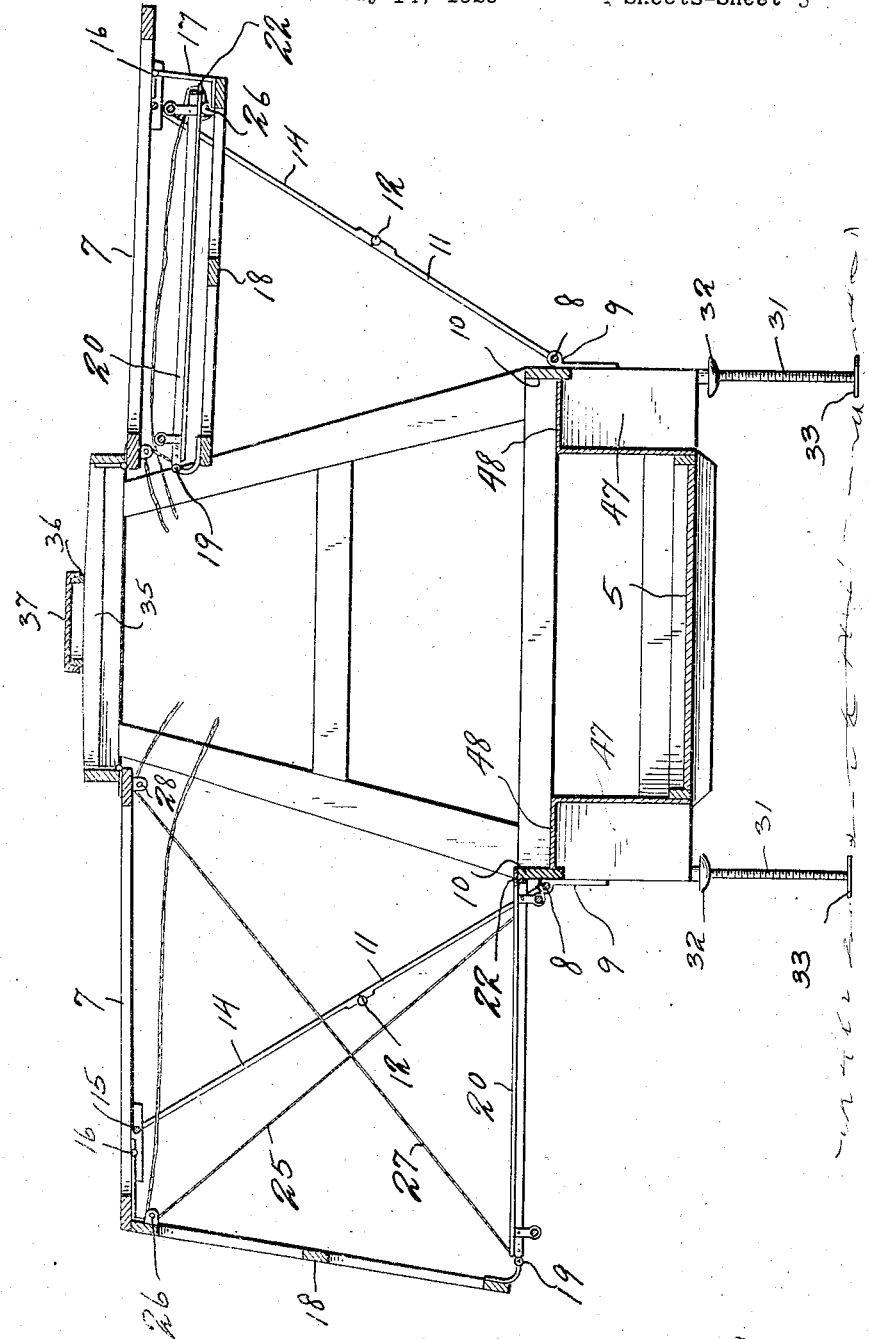

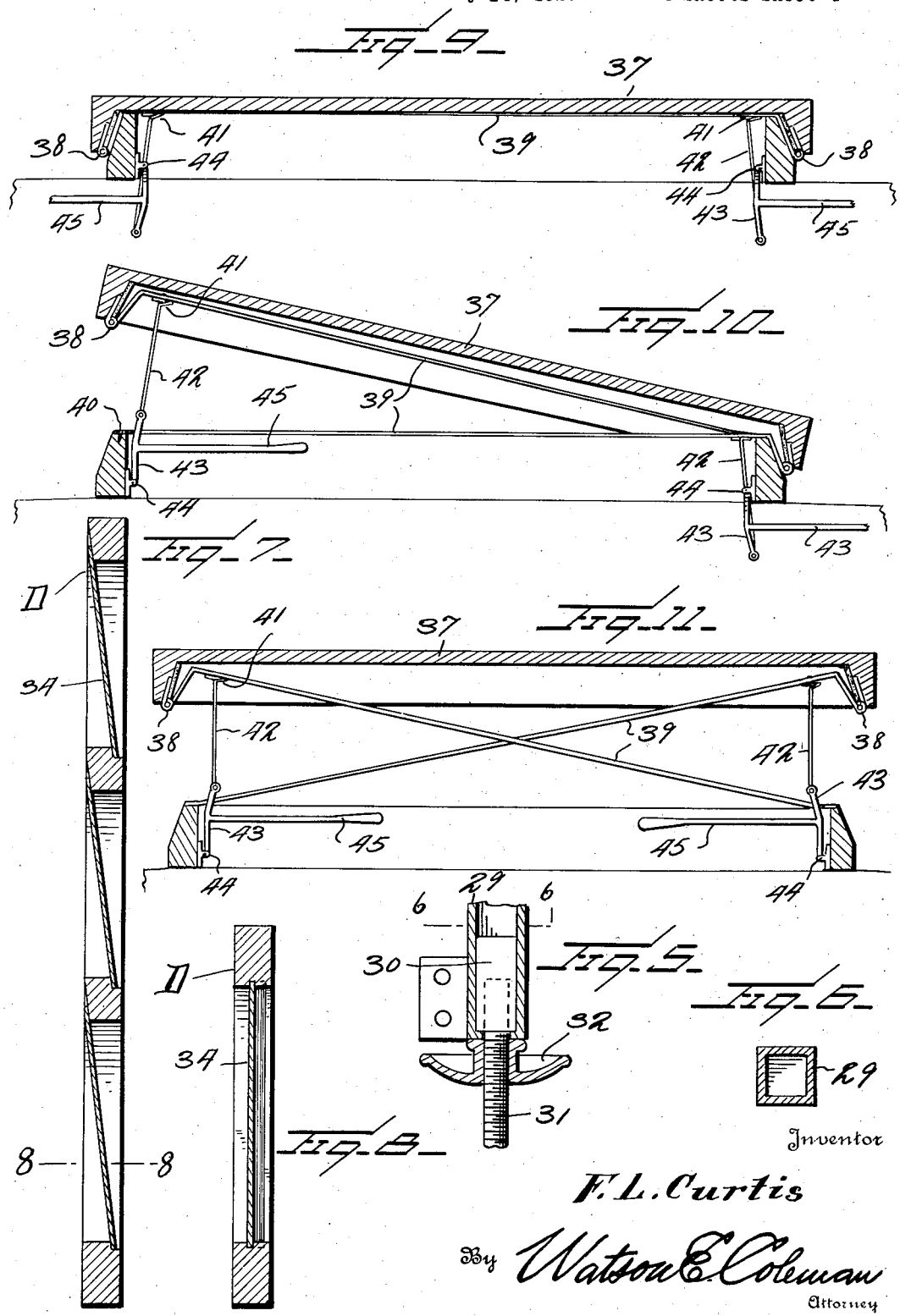

Patented Aug. 24, 1926.

1,596,924

UNITED STATES PATENT OFFICE.

FRED L. CURTIS, OF SIDNEY, NEW YORK.

VEHICLE BODY.

Application filed July 14, 1925. Serial No. 43,566.

This invention relates to certain improvements in vehicle bodies and has relation more particularly to a device of this kind especially designed and adapted for use as a trailer.

It is an object of the invention to provide a device of this general character which may be readily converted into a sleeping outfit and wherein each of the side walls embodies a bed structure.

Another object of the invention is to provide a device of this general character wherein each of the side walls is supported for upward swinging movement together with means for effectively bracing each of said walls when in its raised position and a bed structure associated with said side wall and being substantially automatically extended for occupancy when the side wall is raised.

An additional object of the invention is to provide means whereby the interior of the body may be effectively ventilated when the side walls are in either their lowered or raised positions.

The invention consists in the details of construction and in the combination and arrangement of the several parts of my improved vehicle body whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a vehicle body constructed in accordance with an embodiment of my invention with the parts in closed relation;

Figure 2 is a transverse sectional view taken through the structure as illustrated in Figure 1;

Figure 3 is a view in perspective of the side walls raised with one of the bed structures in working position and a second bed structure in folded position;

Figure 4 is a vertical sectional view taken longitudinally through the structure as illustrated in Figure 3;

Figure 5 is a fragmentary view partly in section and partly in elevation illustrating in detail certain of the structure of a supporting leg;

Figure 6 is a sectional view taken substantially on the line 6—6 of Figure 5;

Figure 7 is a vertical sectional view taken through the door as herein disclosed unapplied;

Figure 8 is a sectional view taken substantially on the line 8—8 of Figure 7;

Figure 9 is a view partly in section and partly in elevation illustrating the ventilator and operating means therefor as herein disclosed;

Figure 10 is a view similar to Figure 9 illustrating the ventilator partially raised or tilted;

Figure 11 is a view similar to Figure 9 showing the ventilator in full raised position.

As disclosed in the accompanying drawings, B denotes the body of my improved trailer of a skeleton structure and which has extending upwardly from its corner portions the supporting members or beams 1 upon which is mounted the top T. The central portion of a side wall 2 of the body B is cut away to provide an entrance opening 3, the sides of said entrance opening being defined by the vertically disposed members 4 which are interposed between the floor 5 of the body B and the top T.

The body B in practice is adapted to be mounted in any preferred manner upon a pair of wheels at opposite sides thereof. As this in itself forms no particular part of the present invention it is believed that a detailed description and illustration thereof is unnecessary.

Hingedly connected, as at 6, to the top T is a side wall 7 adapted to be swung upwardly into substantially a horizontal position, said side wall being constructed in any manner preferred. When raised the side wall 7 is maintained in such position by the brace member M. As herein disclosed, the brace member M comprises a U-shaped section having its intermediate or base portion 8 pivotally connected, as at 9, to the upper portion of a side wall 10 of the body B and the free ends of the side arms 11 of said section have hingedly connected therewith, as at 12, the arms 14 which in turn are pivotally connected, as at 15, with the lower or free end portions of a side wall 7 at the sides thereof. The hinges 12 are of a conventional stop structure so that the side arms 11 and arms 14 are prevented from passing beyond the center as the side wall 7 is raised. When the side walls 7 are lowered, the arms 11 and 14 assume the positions as particularly illustrated in Figures 1 and 2, said arms being herein disclosed as exterior of the body although if desired may be arranged interiorly thereof.

Hingedly connected, as at 16, to the lower or free end portion of each of the side walls 7 and at the sides thereof is an elongated bracket or arm 17 carried by an end portion of a frame 18, said frame being adapted to be swung or folded to underlie a side wall 7 as is clearly illustrated in Figures 2 and 4.

The opposite end of the frame 18 has hingedly connected thereto, as at 19, a bed structure 20 carrying spring bed fabric 21, said bed structure 20 being adapted to be swung or folded to overlie the frame 18 or to be positioned between the folded frame 18 and the adjacent side wall 7 when said parts are in their folded or compacted relation.

Each of the bed structures has angle iron side rails 22 one of which, when the bed structure is in desired extended or working position, rests securely its entire length on the top edge of the adjacent portion of the lower part of the body. It is also to be understood that suitable curtains are to be employed to enclose the end spaces of the bed structures when extended and also that the side wall 7 and the frames 18 are closed in any preferred manner.

Secured to the sides of the bed structure 20 at the free end portions thereof are the extremities of a flexible member 25 which are disposed around the pulleys 26 carried by the opposite sides of the supporting frame 18 adjacent its hinged end, the central or intermediate portion of the flexible member 25 being adapted to be grasped by an operator to exert requisite pull to lift the bed structure 20 to a position overlying the inner face of the frame 18. The hinged end portion of the bed structure 20 at opposite sides thereof has also engaged therewith the extremities of a flexible member 27 which are disposed around the pulleys 28 arranged at opposite sides of a wall 7 at its upper or hinged end. The intermediate or central portion of said flexible member 27 is adapted to be grasped to exert requisite pull to raise the frame 18 and the superimposed bed structure 20 to a position underlying the side wall 7 whereupon the hinged joints 12 are broken to permit the side wall 7 and the folded or compacted frame 18 and bed structure 20 to swing downwardly whereby the side of the body B is closed with the associated bed structure out of the way.

At each corner of the body B is suitably secured a vertically disposed hollow member 29 angular in cross section and in which is freely engaged a block 30 adapted to have sliding movement within the member 29. Secured to this block 30 is the upper end portion of a threaded shank 31 on which is threaded a cup-like nut 32 with which the lower end of the member 29 is adapted to be engaged. By rotating the nut 32 in the requisite direction, the shank 31 may be projected to bring the lower end of the shank in direct contact with the ground or other supporting surface and thereby provide a rigid support for the body B. For this reason the lower end of the shank 31 is provided with a foot 33. The cup-like nut 32 is adapted to contain a supply of oil or the like so that insects will be prevented from passing upwardly into the body B to annoy the occupant thereof and particularly when said body is being used for camping purposes.

Coacting with the members 4 in a conventional manner is a door D provided with the removable panels 34 herein disclosed as solid although if preferred said panels may be in the nature of a screen or glass and are interchangeable.

The top T is provided with a central ventilating opening 35 defined by an upstanding flange 36 with which coacts a ventilator cap 37. Hingedly connected, as at 38, to the ventilator cap 37 at opposite sides thereof are the elongated rods 39. These rods are disposed in opposite directions and each has its free end portion in sliding engagement, as at 40, with the flange 36 remote from the side of the cap 37 with which the rod 39 is pivotally engaged.

Operatively connected, as at 41, with the hinged end portions of each of the rods 39 is a link 42 also operatively engaged with a lever 43, said lever 43 being hingedly connected, as at 44, to the inner face of the flange 36. The central portion of the lever 43 is provided with a laterally directed handle 45 disposed inwardly of the flange 36 and provides means whereby the lever 43 may be swung to completely raise the ventilator cap 37 as indicated in Figure 11 or to raise only a side of said cap as illustrated in Figure 10.

The front and rear ends of the body structure are closed by suitable panels 46.

It is also to be understood that at each side of the body B spaces 47 are provided in which are adapted to be arranged suitable lockers in which may be stored food, ice, clothing, etc., and the top walls 48 above said spaces 47 may be employed with convenience as seat structures.

The forward end of the interior of the structure is also preferably provided with a series of drawers diagrammatically indicated at 49 by dotted lines in Figure 2, the top of which providing a broad shelf upon which may be mounted a stove with or without a pipe.

It is to be understood that my improved vehicle body may be employed to advantage as a camping outfit and also may be conveniently used by peddlers and venders, its ready conversion rendering it particularly practical for the latter use.

From the foregoing description it is thought to be obvious that a vehicle body constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the character described comprising, in combination, a body, a top supported thereby, side walls having their upper marginal portions hingedly connected with the top for upward swinging movement, a frame associated with each side wall, said frame being provided with elongated arms extending laterally from an end portion thereof, the outer extremities of said arms being hingedly connected with the lower portion of the associated side wall, said frame underlying the outer end portion of the side wall when said side wall is in raised position, a bed structure hingedly connected with the opposite end portion of the frame and having swinging movement toward or from the inner face of the frame, said bed structure engaging the body when the side wall is raised and the bed structure lowered, and a brace member interposed between the body and the side wall when said side wall is raised, the frame providing means whereby the outer portion of the bed structure is supported when the side wall is raised.

2. A device of the character described comprising, in combination, a body, a top supported thereby, side walls having their upper marginal portions hingedly connected with the top for upward swinging movement, a frame associated with each side wall, said frame being provided with elongated arms extending laterally from an end portion thereof, the outer extremities of said arms being hingedly connected with the lower portion of the associated side wall, said frame underlying the outer end portion of the side wall when said side wall is in raised position, a bed structure hingedly connected with the opposite end portion of the frame and having swinging movement toward or from the inner face of the frame, said bed structure engaging the body when the side wall is raised and the bed structure lowered, a brace member interposed between the body and the side wall when said side wall is raised, the frame providing means whereby the outer portion of the bed structure is supported when the side wall is raised, guide members carried by the frame at opposite sides thereof and adjacent to its connection with the side wall, a flexible member secured to the marginal portion of the bed structure engageable with the body, said flexible member being disposed over the guide members whereby pull upon the flexible member swings the bed structure toward the frame, a second flexible member secured to the hinged end portion of the bed structure, and additional guide members carried by the end portion of the side wall in hinged connection with the top, said second named flexible member being engaged with said last named guide members to provide means for swinging both the bed structure and the frame toward the side walls before the same is lowered.

In testimony whereof I hereunto affix my signature.

FRED L. CURTIS.